(12) United States Patent
Song (10) Patent No.: US 11,706,694 B1
(45) Date of Patent: Jul. 18, 2023

(54) SYSTEM AND METHOD FOR CLOSED SUBSCRIBER GROUP IDENTITY ALLOCATION FOR RADIO ACCESS NETWORK SHARING

(71) Applicant: T-Mobile Innovations LLC, Overland Park, KS (US)

(72) Inventor: Minho Song, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 10 days.

(21) Appl. No.: 17/398,533

(22) Filed: Aug. 10, 2021

(51) Int. Cl.
*H04W 48/08* (2009.01)
*H04W 8/18* (2009.01)
*H04W 12/08* (2021.01)

(52) U.S. Cl.
CPC .......... *H04W 48/08* (2013.01); *H04W 8/186* (2013.01); *H04W 12/08* (2013.01)

(58) Field of Classification Search
CPC .......................... H04L 12/4641; H04W 12/08
USPC ......................................................... 455/411
See application file for complete search history.

(56) References Cited

U.S. PATENT DOCUMENTS

| | | | | |
|---|---|---|---|---|
| 2010/0210268 A1* | 8/2010 | Lim | ....................... | H04W 48/08 455/436 |
| 2012/0165017 A1* | 6/2012 | Kim | ....................... | H04W 48/06 455/436 |
| 2013/0005340 A1* | 1/2013 | Drazynski | ......... | H04W 36/0009 455/436 |
| 2014/0155063 A1* | 6/2014 | Koide | ................... | H04W 48/16 455/434 |
| 2015/0334615 A1* | 11/2015 | Zhang | ............... | H04W 36/0016 370/331 |
| 2016/0119945 A1* | 4/2016 | Fang | ..................... | H04W 72/21 455/450 |

* cited by examiner

*Primary Examiner* — Fabricio R Murillo Garcia
(74) *Attorney, Agent, or Firm* — Shook, Hardy & Bacon L.L.P.

(57) ABSTRACT

Systems and methods for closed subscriber group identity (CSG ID) allocation for radio access network (RAN) sharing between different wireless telecommunication network providers can include a second CSG administration server receiving a unique first list of CSG IDs from a first CSG administration server, comparing the CSG IDs of the unique first list with a unique second list of CSG IDs associated with the second CSG administration server, and automatically adding to the unique second list ones of the CSG IDs from the unique first list that are absent from the unique second list. If a first one of the CSG IDs from the unique first list is already assigned in the unique second list, a new E-UTRAN Cell Global Identifier (ECGI) is added for use with the first one of the CSG IDs and sent therewith to the first CSG administration server to be added to the unique first list.

15 Claims, 5 Drawing Sheets

SYSTEM AND METHOD FOR CLOSED SUBSCRIBER GROUP IDENTITY ALLOCATION FOR RADIO ACCESS NETWORK SHARING

BACKGROUND

In telecommunication networks, a closed subscriber group (CSG) is a group of one or more users or user equipment (UE) (each of which represent and are associated with a subscriber) that are authorized to access one or more access-restricted radio access points (cell(s)). That is, the CSG's administration server permits only the UEs who are registered subscribers of the CSG to access the access-restricted cell. An access-restricted cell transmits its cell identity in one or more downlink signals (e.g., a synchronization signal block); during cell selection/reselection, a candidate UE receives cell identities of one or more candidate cells and chooses the best cell to connect to. During cell selection/reselection, the candidate UE will query a network (e.g., the UE's home network) in order to determine if it is authorized to connect to the access-restricted cell. If it is not authorized, the candidate UE will ignore the access-restricted cell. Currently, if a first network operator assigns a cell identity to the access-restricted cell and a second network operator is later permitted to allow its subscribers to access the access-restricted cell, then subscribers of the second network operator may not be capable of attaching to the access-restricted cell because they are not given the correct cell identity—caused by a lack of synchronous CSG identities being stored in each of the network operators' CSG administration servers.

SUMMARY

The present disclosure is directed, in part, to systems and methods for closed subscriber group identity (CSG ID) allocation for radio access network (RAN) sharing between different wireless telecommunication network providers. The system can include a first CSG administration server and a second CSG administration server. The first CSG administration server can have a unique first list of CSG IDs and can be configured to send the unique first list to another CSG administration server. The second CSG administration server can be configured to receive the unique first list of CSG IDs to be stored therein and/or to update a unique second list of CSG IDs based on the unique first list of CSG IDs.

According to another aspect, a method for CSG ID allocation for RAN sharing between different wireless telecommunication network providers can include a step of receiving with the second CSG administration server the unique first list of CSG IDs from the first CSG administration server. Then the method can include a step of the second CSG administration server comparing at least some of the CSG IDs of the unique first list with the unique second list of CSG IDs associated with the second CSG administration server. The method can also include a step of automatically adding to the unique second list ones of the CSG IDs from the unique first list that are absent from the unique second list.

Yet another embodiment includes one or more non-transitory computer-readable media having computer-executable instructions embodied thereon that, when executed on one or more processors of one or more wireless telecommunication services, perform various steps for CSG ID allocation for RAN sharing between different wireless telecommunication network providers. The steps can include, for example, receiving with the second CSG administration server the unique first list of CSG IDs from the first CSG administration server. The first CSG administration server can be associated with a first operator network and the second CSG administration server can be associated with a second operator network. The steps can also include comparing, via the second CSG administration server, at least some of the CSG IDs of the unique first list with the unique second list of CSG IDs associated with the second CSG administration server. Furthermore, the steps can include automatically adding to the unique second list, via the second CSG administration server, ones of the CSG IDs from the unique first list that are absent from the unique second list.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of this technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, in telecommunications networks, a closed subscriber group (CSG) is a group of one or more users or user equipment (UE) (each of which represent and are associated with a subscriber) that are authorized to access one or more access-restricted radio access points (cell(s)). The UE can include, for example, smart phones or other such devices operable to communicate via telecommunication networks. The UEs access the CSGs via CSG administration servers maintained by different network operators. A CSG administration server permits only the UEs who are registered subscribers of the CSG to access the access-restricted cell using a corresponding CSG identity or CSG ID. The CSG identity or CSG ID is assigned by these network operators, such as various ones of the national cell phone carriers and/or Citizens Broadband Radio Service (CBRS). The CSG ID is a fixed length 27 bit value used to identify a CSG when being accessed by UEs.

An access-restricted cell transmits its cell identity or CSG ID in one or more downlink signals (e.g., a synchronization signal block); during cell selection/reselection, a candidate UE receives CSG IDs of one or more candidate cells and chooses the best cell to connect to. During cell selection/reselection, the candidate UE will query a network (e.g., the UE's home network) in order to determine if it is authorized to connect to the access-restricted cell. If it is not authorized, the candidate UE will ignore the access-restricted cell.

Currently, if a first network operator assigns a cell identity to the access-restricted cell and a second network operator is later permitted to allow its subscribers to access the access-restricted cell, then subscribers of the second network operator may not be capable of attaching to the access-restricted cell because they are not given the correct cell identity or CSG ID. This is caused by a lack of synchronous CSG IDs being stored in each of the network operators' CSG administration servers and limits the sharing of network resources between various networks.

The present disclosure is generally directed to a system for the allocation of CSG IDs for RAN sharing. Specifically, to allow for sharing of network resources, as disclosed herein, a RAN sharing cell can be used across a plurality of operators via a unique CSG ID list as applied via the systems and methods described herein. By keeping a unique CSG ID list in one of the CSG administration servers and sending this list to others of the CSG administration servers, CSG IDs not yet assigned in a receiving one of the CSG administration servers can be stored from the unique CSG ID list. If the CSG ID is already assigned in the receiving one the CSG administration servers, an ECGI can be added for the already-assigned CSG ID, and then the pair [CSG ID:ECGI] can be multicast or otherwise communicated back to the sending one of the CSG administration servers, such that this new pair is stored in the unique CSG ID list. Using these and other methods described herein, the unique CSG ID list may be kept in the CSG administration servers across all the operators. The methods described in here can also include comparing the resulting universal CSG ID list periodically between the various CSG administration servers to maintain consistency. Other aspects and details of this technology will be described in detail below.

Figure 1:
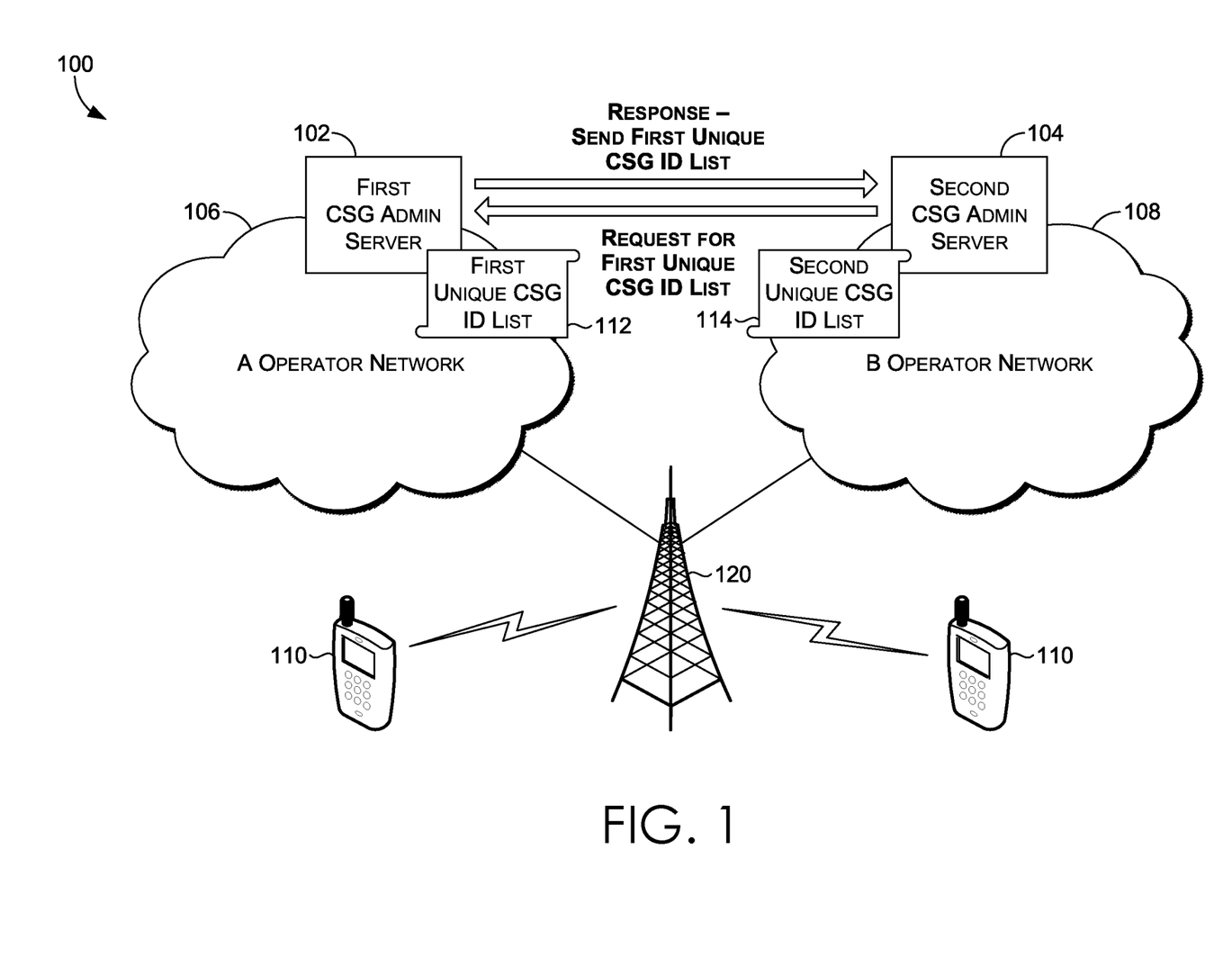
FIG. 1 depicts a diagram of an exemplary system suitable for use in implementations of the present disclosure, sharing data in accordance with aspects herein.
Figure 2:
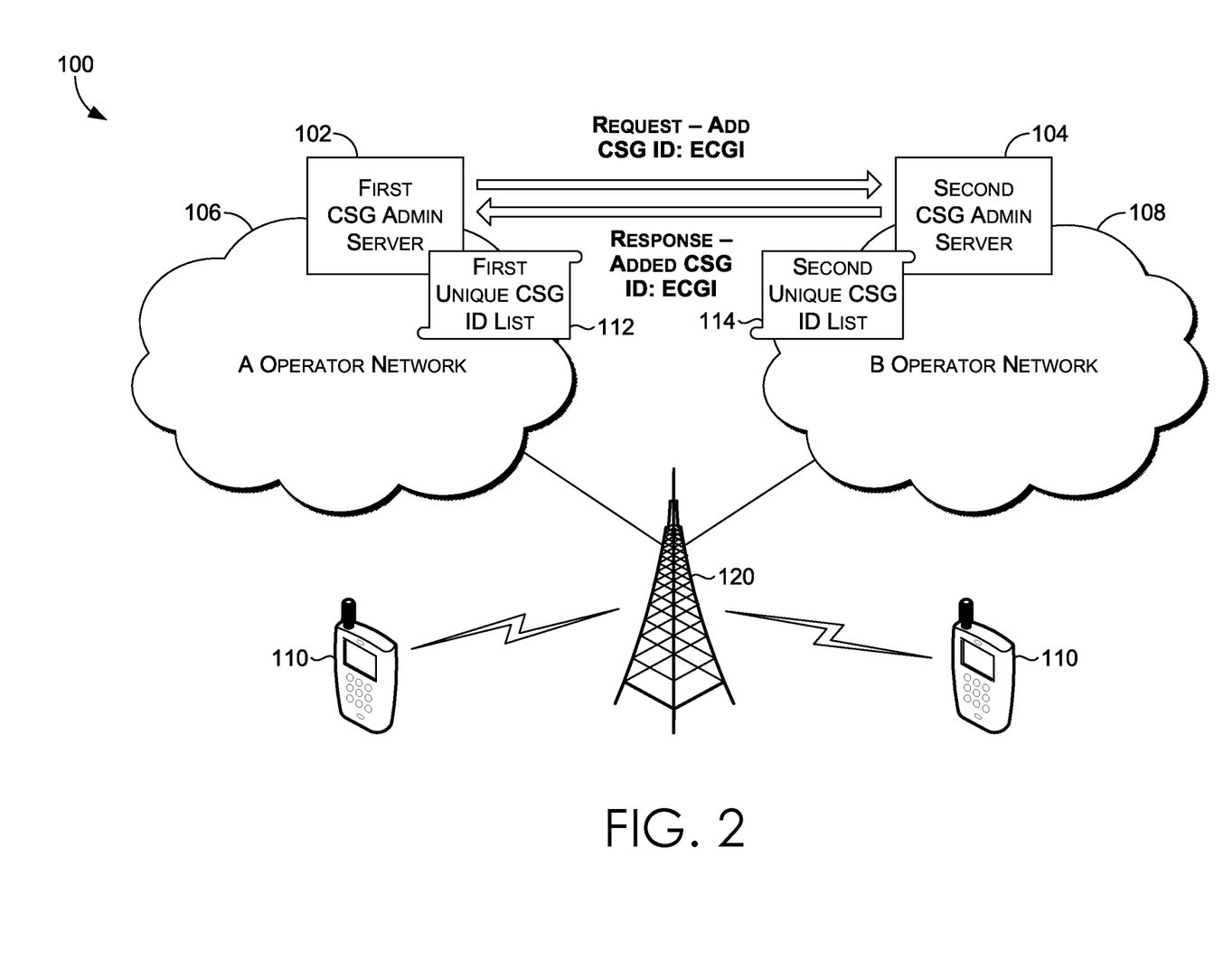
FIG. 2 depicts a diagram of the exemplary system of FIG. 1, adding data in accordance with aspects herein.
Figure 3:
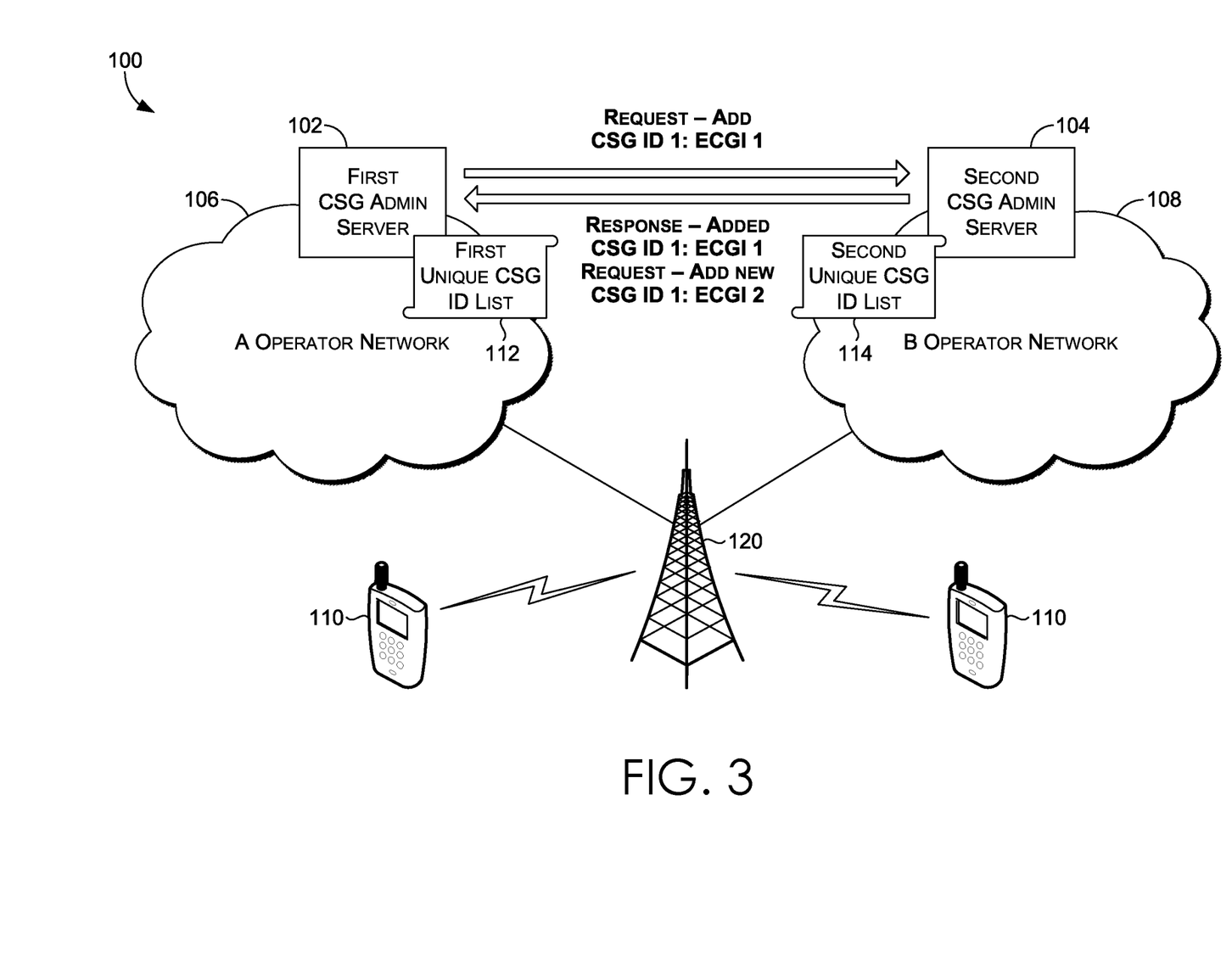
FIG. 3 depicts a diagram of the exemplary system of FIG. 1, updating and adding data in accordance with aspects herein.

FIGS. 1-3 provide an exemplary system 100 in which implementations of the present disclosure may be employed for CSG ID allocation for RAN sharing between different wireless telecommunication network providers. The system 100 can include a plurality of telecommunications networks and other components of a suitable environments for the methods described herein and are not intended to suggest any limitation as to the scope of use or functionality of the technology described herein. Neither should the system 100 be interpreted as having any dependency or requirement relating to any one or combination of components illustrated.

The system 100 can include a first CSG administration server 102 and/or a second CSG administration server 104. However, any plurality of CSG administration servers can operate in the manners described herein for the first and second CSG administration servers 102,104 without departing from the scope of the technology herein. For example, the first CSG administration server 102 can perform any or all of the functions of the second CSG administration server 104 and the second CSG administration server 104 can perform any or all of the functions of the first CSG administration server 102. Any of the CSG administration servers, such as the first and/or second CSG administration servers 102,104 can include any of the hardware components and/or functionality of computing device 500 depicted in FIG. 5 and described in detain below, such as processing capabilities, communication capabilities, and data storage.

As depicted in FIG. 1, the first CSG administration server 102 can be associated with a first operator network 106, while the second CSG administration server 104 can be associated with a second operator network 108. Furthermore, one or more UEs 110 can communicate with at least one of the CSG administration servers 102,104, sending and receiving data in order to access, for example, a particular CSG. For example, data can be sent via cell towers 120 or the like.

In a simplified and illustrative call flow, the one or more UEs 110 may execute a procedure for identifying/determining which cell to attach to. Examples of when said procedure may occur include cell selection or reselection. During the acquisition and selection procedure, the one or more UEs 110 may receive downlink signals from a plurality of cells. Each cell will relevantly include cell identifying information and certain other information, generally referred to herein as cell selection parameters. Generally, the one or more UEs 110 will consider each of the candidate cells, from which it receives cell selection parameters, and make a decision, whether based on device or carrier policies, about which cell to attach/reattach to.

During the acquisition and selection procedure, the one or more UEs 110 may communicate a query, via a radio access network, to a core network (e.g., the home network's core associated with the subscriber affiliated with the one or more UEs 110). Said query may relevantly comprise one or more communications/calls between various network components to determine if the one or more UEs 110 are authorized to attach to the candidate cells. Specifically, a CSG administration server, working alone or in combination with one or more other network components (e.g., an AUSF, AMF, UDM/UDR, and the like) may determine and communicate back to the one or more UEs 110 that the one or more UEs 110 is authorized to connect to certain access-restricted cells, in aspects, based on their CSG (cell) identifier or CSG ID.

If the one or more UEs 110 is informed that it is authorized to connect to a particular CSG cell which was one of the candidate cells, it will consider that cell during the acquisition and selection procedure; in contrast, if the one or more UEs 110 is informed that is not authorized to connect to the particular CSG cell (e.g., as a result of receiving a list of authorized cells and the particular CSG cell not being in the list or a result of a cell-specific query that specifically indicates that the one or more UEs 110 are not authorized to attach to the particular CSG cell), the one or more UEs 110 will ignore the CSG cell and only consider other candidate cells for acquisition and selection. In some aspects, the result of this process may be cached locally on the one or more UEs 110 with an expiration date that provides an expedited, locally-sourced indication for subsequent cell acquisition and selection before the expiration date.

In one embodiment, the first CSG administration server 102 has stored thereon or otherwise accessible thereto a unique first list 112 of CSG IDs. The unique first list 112 of CSG IDs can comprise a plurality of CSG IDs and any associated data assigned to each of the CSG IDs, allowing for UE access to a particular one of the CSGs indicated by one of the CSG IDs. The CSG IDs in the unique first list 112 or any lists described herein can also be listed as being associated with a specific E-UTRAN Cell Global Identifier (ECGI). For example, the CSG ID and the ECGI can be included in pairs within the unique first list 112, such as [CSG Id:ECGI]. The ECGI is used to identify cells globally. The ECGI is constructed from the MCC (Mobile Country Code), MNC (Mobile Network Code) and the ECI (E-UTRAN Cell Identifier).

In some embodiments, the first CSG administration server 102 is configured to send the unique first list 112 to another CSG administration server, such as the second CSG administration server 104, as depicted in FIG. 1. This can be sent via multicasting or other transmission means used between servers and/or used within various telecommunications networks. This results in the sharing of the CSG IDs and data assigned thereto, as stored in the unique first list 112. In some embodiments, this also results in the CSG ID and the ECGI pairs being communicated to other CSG administration servers, such as the second CSG administration server 104.

The second CSG administration server 104 can be configured to receive the unique first list 112 of CSG IDs. How the second CSG administration server 104 handles the CSG IDs of the unique first list 112 depends on a number of factors. If the second CSG administration server 104 is first being set up, the second CSG administration server 104 can be configured to, upon initial set up thereof, search for one or more neighboring CSG administration servers. For example, the first CSG administration server 102 can be identified as one of its neighboring CSG administration servers. Upon making this determination, in some embodiments, the second CSG administration server 104 is configured to automatically request the unique first list 112 of CSG IDs from the first CSG administration server 102.

In some embodiments, the second CSG administration server 104 comprises a unique second list 114 of CSG IDs, as depicted in FIG. 1. The unique second list 114 of CSG IDs can comprise a plurality of CSG IDs and any associated data assigned to each of those CSG IDs, allowing for UE access to a particular one of the CSGs indicated by one of the CSG IDs. In this embodiment, the second CSG administration server 104 can be configured to add CSG IDs from the unique first list 112 that are absent from the unique second list 114 into the unique second list 114.

In some embodiments, the first CSG administration server 102 is configured to periodically send the unique first list 112 to the second CSG administration server 104 for a consistency check, and the second CSG administration server 104 is configured to send an alarm or notice to operators of the first CSG administration server 102 or the second CSG administration server 104 with any inconsistent CSG ID information found during the consistency check. Those inconsistencies can include instances where the same CSG IDs are assigned to different CSGs, which can lead to confusion among UEs attempting to sign into one of the CSGs. The operators can then determine how to address these inconsistencies between each other based on predefined rules or manual changes to accommodate for these conflicts.

However, as depicted in FIG. 3, the second CSG administration server 104 can also be configured to identify if any of the CSG IDs from the unique first list 112 are already assigned in the unique second list 114. Then, for example, if a first one of the CSG IDs from the unique first list 112 are already assigned in the unique second list, the second CSG administration server 104 can also be configured to add to the unique second list 114 a new E-UTRAN Cell Global Identifier (ECGI) to associate with the first one of the CSG IDs and then send the new ECGI along with the first one of the CSG IDs to the first CSG administration server 102. As a result of receiving this first one of the CSG IDs along with the new ECGI, the first CSG administration server 102 can likewise be configured to add the new ECGI along with the first one of the CSG IDs to the unique first list 112.

In use, when setting up a cell for a CSG ID for a first time, at least one of the CSG administration servers 102,104 can find/assign a not-yet-used CSG ID based on the unique list of CSG IDs associated therewith, and then multicast the [CSG ID:ECGI] info to all the CSG administration servers 102,104, as depicted in FIG. 2. In some embodiments, at least one of the unique first list 112 and/or the unique second list 114 can be a universal CSG ID list and can be sent to all of the CSG administration servers 102,104 periodically in a short or long interval (e.g., 30 minutes) to maintain consistency. If there is any inconsistency found, an alarm or notification with the inconsistent information will be raised for one or more operators to check and/or manually address.

In some embodiments, for a RAN sharing cell with an already assigned CSG ID, a new ECGI can be added to use the already-assigned CSG ID and multicast [CSG ID:ECGI] to all the CSG administration servers 102,104 so that the newly-added ECGI can be updated to the already-assigned CSG ID in all the CSG administration servers 102,104. For example, as depicted in FIG. 3, if the pair [CSG ID 1:ECGI 1] is included in both the unique first list 112 and the unique second list 114, another pair [CSG ID 1:ECGI 2] can be generated and then sent back to be added into the unique first list 112. Likewise, this new pair [CSG ID 1:ECGI 2] can be multicast out to other ones of the one or more neighboring CSG administration servers to be added to unique CSG ID lists associated therewith.

Figure 4:
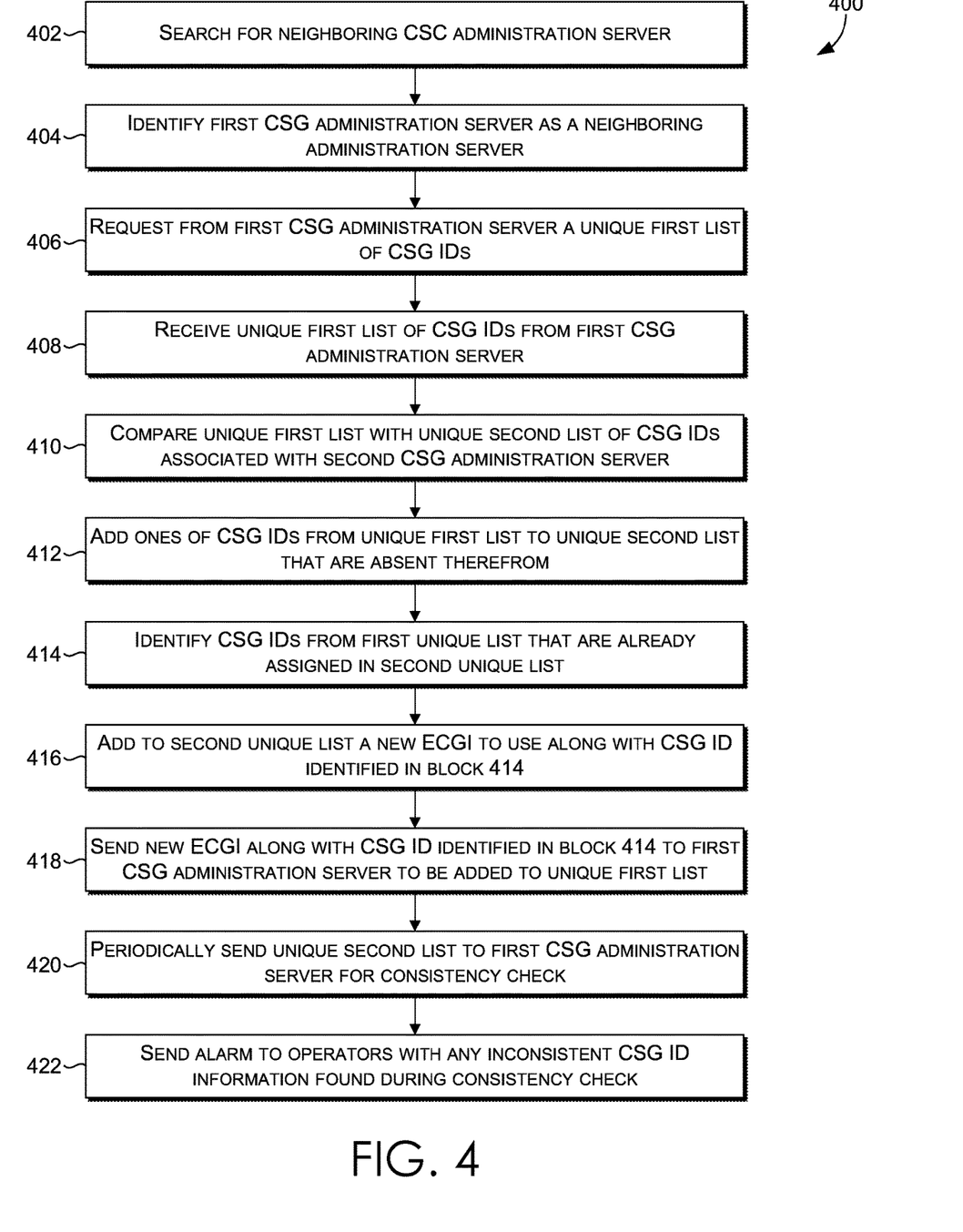
FIG. 4 depicts a flow diagrams of exemplary methods for CSG ID allocation in accordance with aspects herein.

The systems and methods described herein can be utilized by the UEs as follows. The second CSG administration server can be configured to receive the unique first list of CSG IDs from the first CSG administration server, then receive from one of the UEs a request for determining whether the UE is authorized to attach to a cell. The cell can be associated, for example, with a first radio access network. Furthermore, the second CSG administration server can be configured to also send a response to the UE comprising an indication that the UE is authorized to connect or attach to the cell based on a CSG ID associated with the cell and the unique first list of the CSG IDs. For example, if the CSG ID associated with the cell is on the unique first list and/or on the unique second list, as described above, the second CSG administration server can determine that the UE is authorized to connect to or attach to the cell and can send an indication thereof to the UE. The UE then connects or attaches to the cell. Otherwise, the second CSG administration server can determine that the UE is not authorized to connect to or attach to the cell and can send an indication thereof to the UE. As depicted in FIG. 4, a method 400 for CSG ID allocation for RAN sharing between different wireless telecommunication network providers can include a number of steps, which can occur in the order depicted herein or in any other order without departing from the scope of the technology herein. Furthermore, one or more steps can be added, omitted, or duplicated without departing from the scope of the technology described herein. As depicted in block 402, the method 400 can include searching, upon initial set up of the second CSG administration server 104, for one or more neighboring CSG administration servers, such as the first CSG administration server. If there is no neighbor CSG administration server found, the CSG ID list that the second CSG administration server 104 has provided therein remains unchanged.

In some embodiments, the method 400 can include a step of identifying the first CSG administration server 102 as one of the one or more neighboring CSG administration servers, as depicted in block 404 and, in response to the identifying, automatically requesting from the first CSG administration server 102 the unique first list 112 of the CSG IDs, as depicted in block 406. As disclosed above, each of the CSG IDs in the unique first list 112 can also include therewith a corresponding ECGI, listed in pairs, such as pair [CSG ID 1:ECGI 1]. In response to the request of block 406, the first CSG administration server 102 can send the unique first list 112 of CSG IDS to the second CSG administration server 104. Note that although a first CSG administration server 102 is disclosed as one of the one or more neighboring CSG administration servers, other CSG administration servers can similarly be identified as one of the one or more neighboring CSG administration servers without departing from the scope of the technology described herein.

The method 400 can further comprise a step of receiving with the second CSG administration server 104 the unique first list 112 of CSG IDs from the first CSG administration server 102, as depicted in block 408. The unique first list 112 may be stored as a unique second list if no unique second list is assigned to the second CSG administration server 104 by the network provider during set up. Additionally or alternatively, the method 400 can further include a step of comparing, via the second CSG administration server 104, at least some of the CSG IDs of the unique first list 112 with the unique second list 114 of CSG IDs, as depicted in block 410. As described above, the unique second list 114 can be accessed by, stored in, and/or otherwise associated with the second CSG administration server 104. For example, this comparing step can be used for an already set-up RAN sharing cell, such as if the second CSG administration server 104 is already set up and already has the unique second list 114 stored therein or assigned thereto.

As depicted in block 412, the method 400 can also include a step of automatically adding to the unique second list 114, via the second CSG administration server 104, ones of the CSG IDs from the unique first list 112 that are absent from the unique second list 114. This allows RAN sharing between networks by filling in CSG IDs from the unique first list 112 that were not present in the unique second list 114.

On the other hand, as depicted in block 414, the method 400 can further include the steps of identifying, via the second CSG administration server 104, any of the CSG IDs from the unique first list 112 that are already assigned in the unique second list 114. In response to the identifying step of block 414, the method 400 includes the steps of adding a new E-UTRAN Cell Global Identifier (ECGI) to use with the first one of the CSG IDs, as depicted in block 416, and sending the new ECGI along with the first one of the CSG IDs from the first CSG administration server to the first CSG administration server to be added to the unique first list 112, as depicted in block 418. For example, as depicted in FIG. 3, if the pair [CSG ID 1:ECGI 1] is included in both the unique first list 112 and the unique second list 114, another pair [CSG ID 1:ECGI 2] can be generated and then sent back to be added into the unique first list 112. Likewise, this new pair [CSG ID 1:ECGI 2] can be multicast out to other ones of the one or more neighboring CSG administration servers to be added to unique CSG ID lists associated therewith. Thus, the pair [CSG ID 1:ECGI 1] can have data associated therewith in the second unique first list 114 replaced with data associated therewith in the first unique list 112, since the new pair is now associated with the previous data associated therewith in the unique second list.

Finally, the method 400 can also comprise the steps of periodically sending the unique second list 114 to the first CSG administration server 102 for a consistency check, as depicted in block 420, and sending an alarm or notification to operators of the first CSG administration server 102 and/or the second CS G administration server 104 (and/or any other neighboring CSG administration servers) with any inconsistent CSG ID information found during the consistency check, as depicted in block 422. In some embodiments, the unique second list 114 can be a universal CSG ID list maintained using the methods described herein. The sending can include multicasting or other remote communication methods known in the art. Inconsistent CSG ID information can include, for example, identical pairs of CSG IDs and ECGIs (e.g., [CSG ID 1:ECGI 1]) that are associated with different CSGs when comparing the second unique list 114 with the first unique list 112 or any other unique lists of CSG IDs associated with other ones of the neighboring administration servers. This can require operator intervention, particularly at a point after initial set up of each of the offending CSG administration servers because it may be unclear which of the CSG administration servers should perform steps 416 and 418 to compensate for the inconsistency or conflict therebetween.

Figure 5:
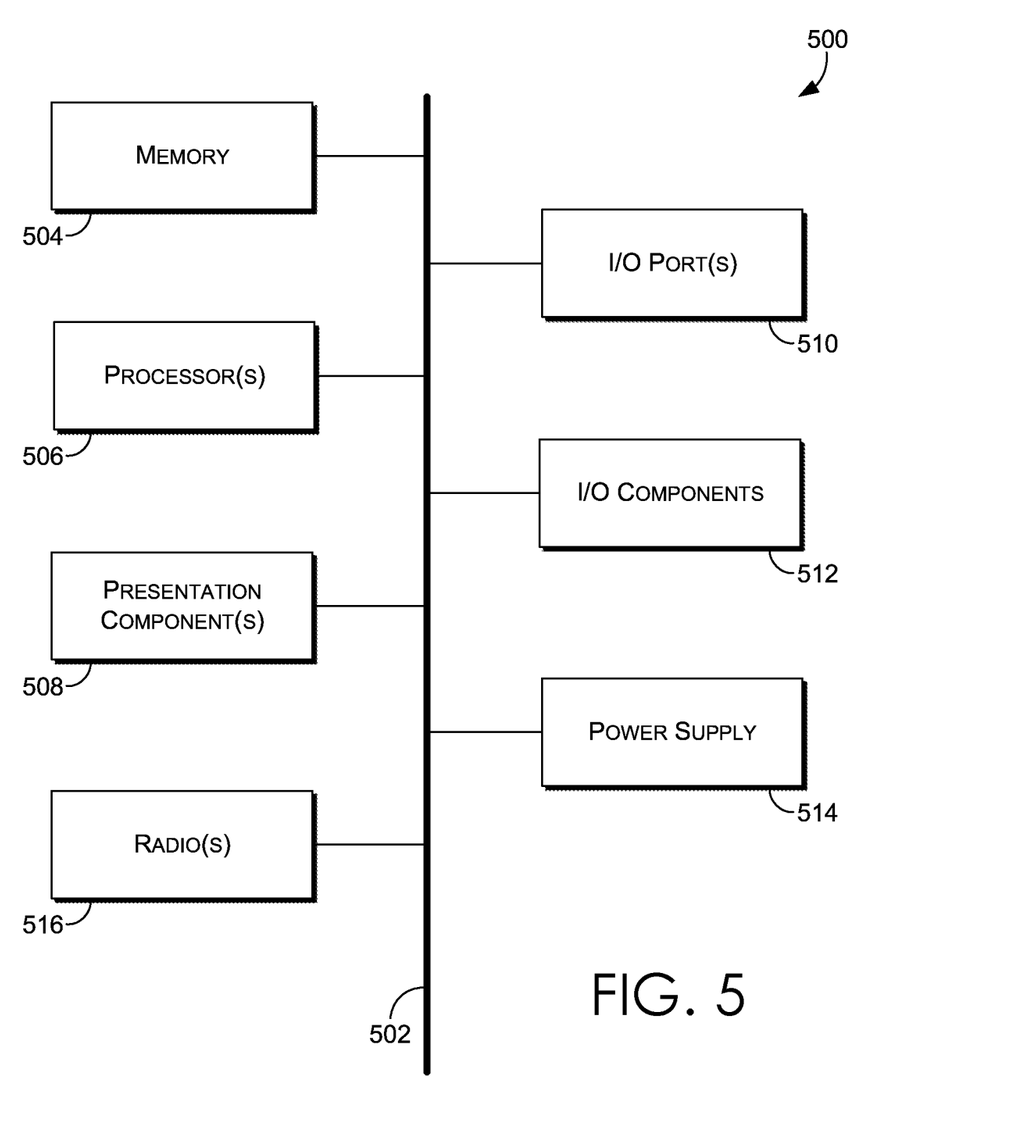
FIG. 5 depicts an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for closed subscriber group identity (CSG ID) allocation for radio access network (RAN) sharing between different wireless telecommunication network providers, the system comprising:
 a second CSG administration server configured to:
  receive a unique first list of CSG IDs from a first CSG administration server,
  receive, from a user equipment (UE), a request for determining whether the UE is authorized to attach to a cell, wherein the cell is associated with a first radio access network, and
  communicate a response to the request comprising an indication that the UE is authorized to connect or attach to the cell based on a CSG ID associated with the cell and the unique first list of CSG IDs,
  wherein the second CSG administration server further comprises a unique second list of CSG IDs, and wherein the second CSG administration server is configured to identify whether any of the CSG IDs from the unique first list are already assigned in the unique second list, and
  wherein if a first one of the CSG IDs from the unique first list are already assigned in the unique second list, the second CSG administration server is configured to add to the unique second list a new E-UTRAN Cell Global Identifier (ECGI) to associate with the first one of the CSG IDs and then send the new ECGI along with the first one of the CSG IDs to the first CSG administration server.

2. The system of claim 1, wherein the second CSG administration server is configured to add CSG IDs from the unique first list that are absent from the unique second list.

3. The system of claim 1, wherein the first CSG administration server is associated with a first operator network and the second CSG administration server is associated with a second operator network.

4. The system of claim 1, wherein the second CSG administration server is configured to, upon initial set up of the second CSG administration server, search for one or more neighboring CSG administration servers.

5. The system of claim 4, wherein, upon determining that the first CSG administration server is one of the one or more neighboring CSG administration servers, the second CSG administration server is configured to automatically request the unique first list of CSG IDs from the first CSG administration server.

6. The system of claim 1, wherein the second CSG administration server is further configured to send instructions to the first CSG administration server to add the new ECGI along with the first one of the CSG IDs to the unique first list stored by the first CSG administration server.

7. The system of claim 1, wherein the second CSG administration server is configured to periodically send the unique first list to the first CSG administration server for a consistency check and wherein the second CSG administration server is configured to send an alarm to operators of the first CSG administration server or the second CSG administration server with any inconsistent CSG ID information found during the consistency check.

8. A method for closed subscriber group identity (CSG ID) allocation for radio access network (RAN) sharing between different wireless telecommunication network providers, the method comprising:
 receiving with a second CSG administration server a unique first list of CSG IDs from a first CSG administration server;
 comparing, via the second CSG administration server, at least some of the CSG IDs of the unique first list with a unique second list of CSG IDs associated with the second CSG administration server;
 identifying any of the CSG IDs from the unique first list that are already assigned in the unique second list; and
 in response to a first one of the CSG IDs from the unique first list are already assigned in the unique second list, adding a new E-UTRAN Cell Global Identifier (ECGI) to use with the first one of the CSG IDs; and sending the new ECGI along with the first one of the CSG IDs to the first CSG administration server to be added to the unique first list.

9. The method of claim 8, wherein the first CSG administration server is associated with a first operator network and the second CSG administration server is associated with a second operator network.

10. The method of claim 8, further comprising searching, upon initial set up of the second CSG administration server, for one or more neighboring CSG administration servers.

11. The method of claim 10, further comprising identifying the first CSG administration server as one of the one or more neighboring CSG administration servers; and, in response to the identifying, automatically requesting from the first CSG administration server the unique first list of the CSG IDs.

12. The method of claim 8, further comprising periodically sending the unique second list to the first CSG administration server for a consistency check; and sending an alarm to operators of the first CSG administration server or the second CSG administration server with any inconsistent CSG ID information found during the consistency check.

13. One or more non-transitory computer-readable media having computer-executable instructions embodied thereon for closed subscriber group identity (CSG ID) allocation for radio access network (RAN) sharing between different wireless telecommunication network providers that, when executed on one or more processors of one or more wireless telecommunication services, perform steps that include:
 receiving with a second CSG administration server a unique first list of CSG IDs from a first CSG administration server, wherein the first CSG administration server is associated with a first operator network and the second CSG administration server is associated with a second operator network;
 comparing, via the second CSG administration server, at least some of the CSG IDs of the unique first list with a unique second list of CSG IDs associated with the second CSG administration server;
 identifying any of the CSG IDs from the unique first list that are already assigned in the unique second list; and
 in response to a first one of the CSG IDs from the unique first list are already assigned in the unique second list, adding a new E-UTRAN Cell Global Identifier (ECGI) to use with the first one of the CSG IDs; and sending the new ECGI along with the first one of the CSG IDs to the first CSG administration server to be added to the unique first list.

14. The non-transitory computer-readable media of claim 13, further comprising the steps of:

searching, upon initial set up of the second CSG administration server, for one or more neighboring CSG administration servers;

identifying the first CSG administration server as one of the one or more neighboring CSG administration servers; and, in response to the identifying, automatically requesting from the first CSG administration server the unique first list of the CSG IDs.

15. The non-transitory computer-readable media of claim 13, further comprising the steps of:

periodically sending the unique second list to the first CSG administration server for a consistency check; and sending an alarm to operators of the first CSG administration server or the second CSG administration server with any inconsistent CSG ID information found during the consistency check.

\* \* \* \* \*